April 1, 1969     A. C. BRUCE ET AL     3,436,231
PACKAGING OF BANANAS FOR SHIPMENT AND CONTROLLED RIPENING
Filed Aug. 23, 1965     Sheet 1 of 3
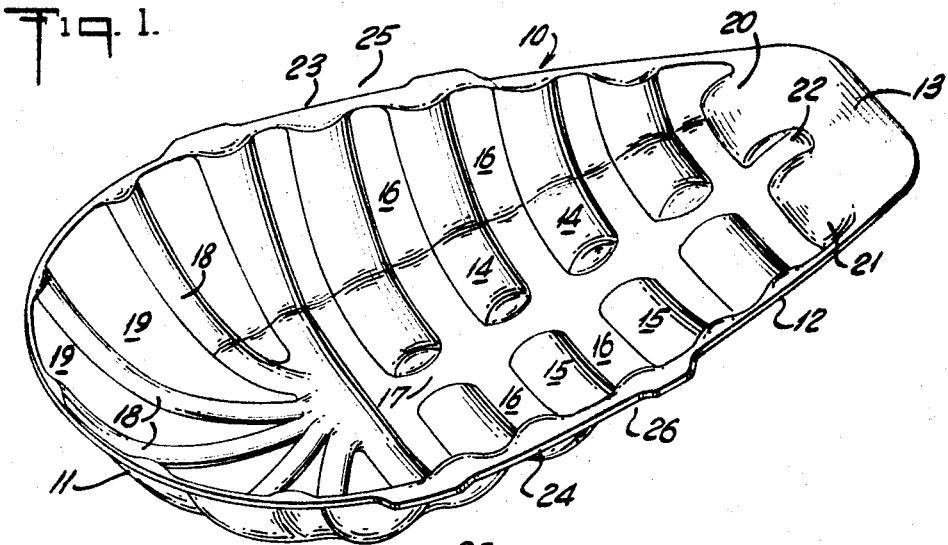
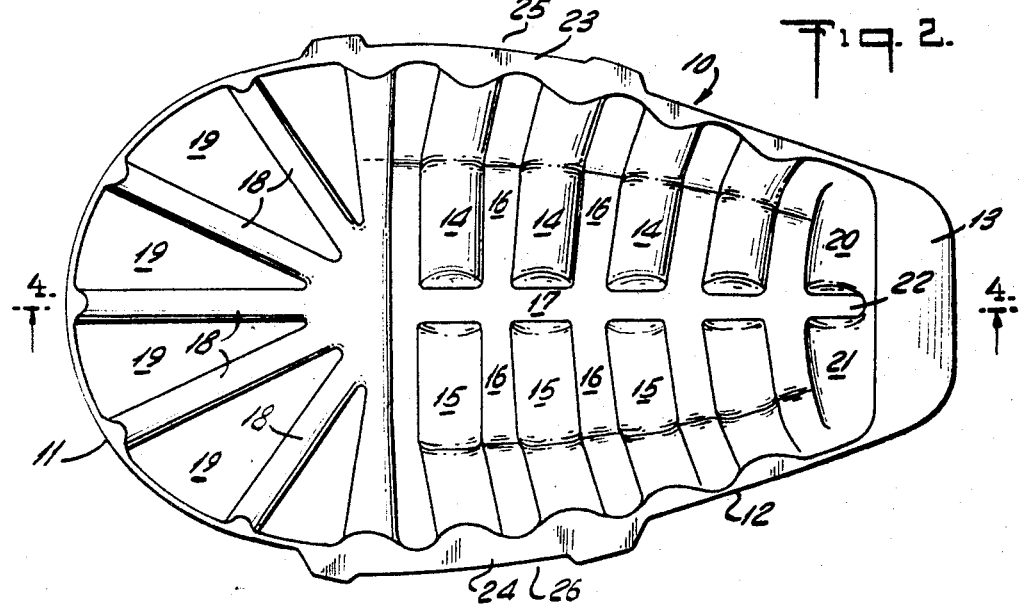
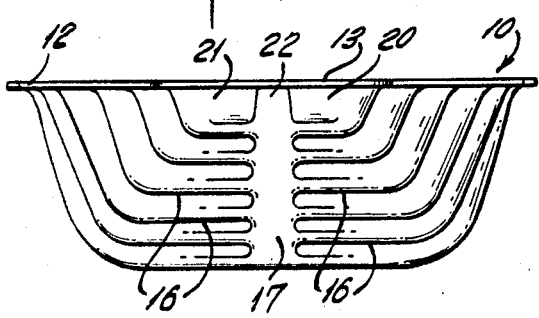
INVENTORS
ALFRED C. BRUCE
THOMAS M. BRITT
BY John J. Rogan
ATTORNEY

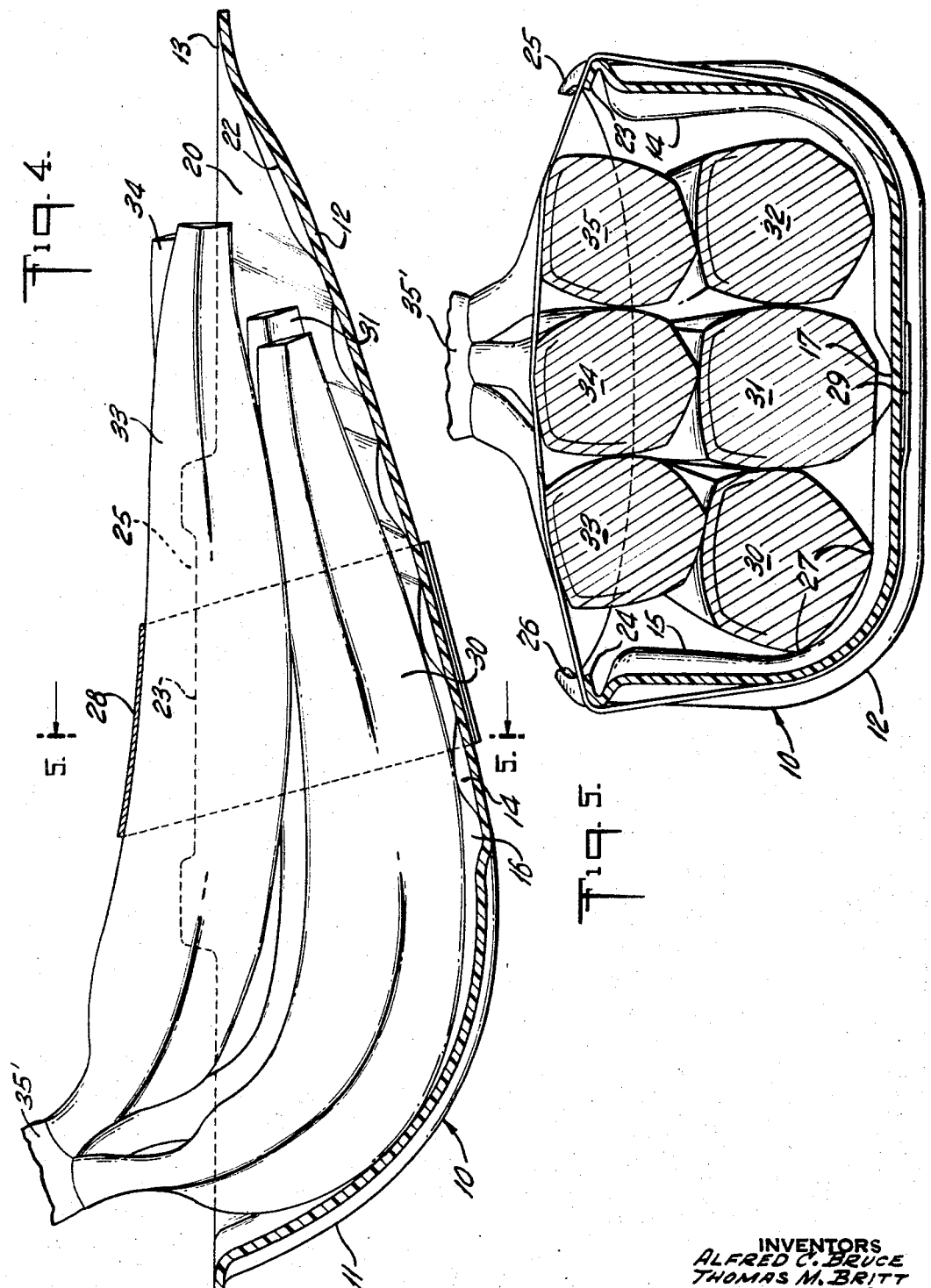

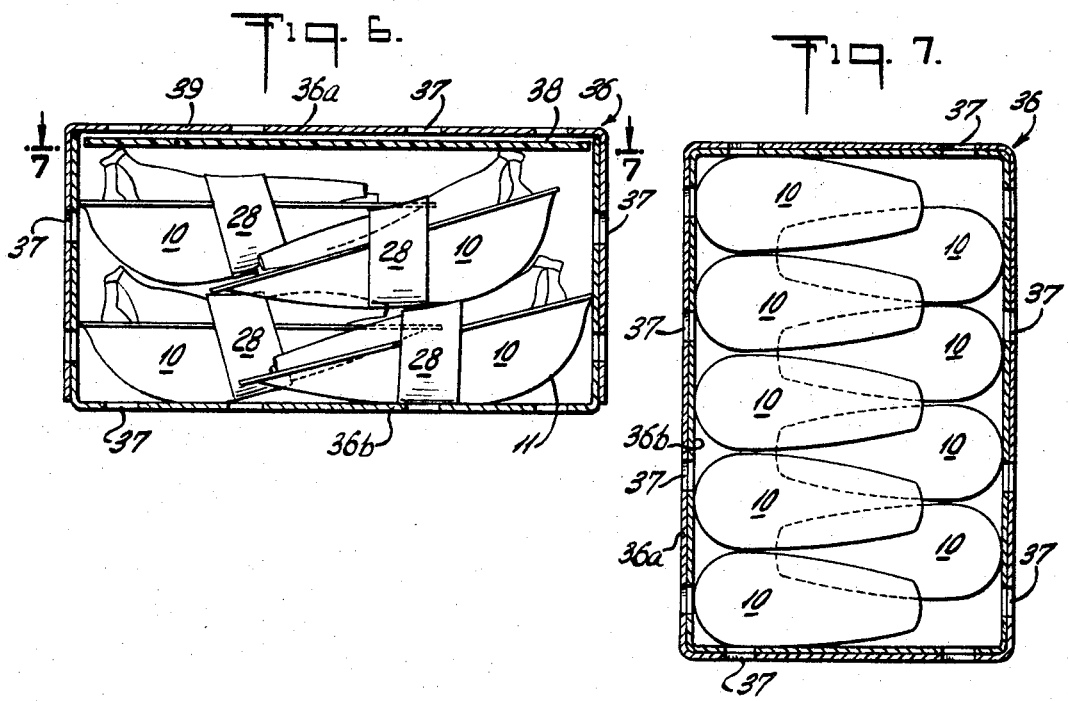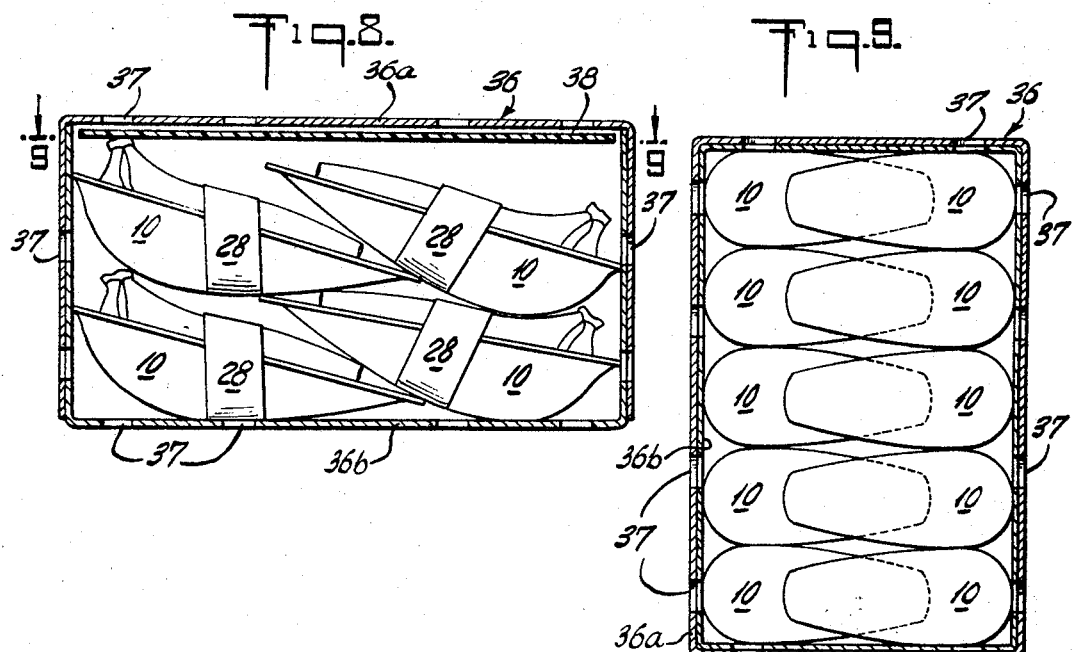

3,436,231
PACKAGING OF BANANAS FOR SHIPMENT AND CONTROLLED RIPENING
Alfred C. Bruce, 72 Rose Hill Road, Southport, Conn. 06490, and Thomas M. Britt, 585 Navesink River Road, Red Bank, N.J. 07701
Filed Aug. 23, 1965, Ser. No. 481,540
Int. Cl. B65b 25/04; A23b 7/14
U.S. Cl. 99—171      5 Claims

ABSTRACT OF THE DISCLOSURE

Small groups of bananas are retained in a concave shell made from foamed plastic which protects the group from contact with other such groups and their packaging container. Each shell substantially encloses its group and is provided with channel defining embossments which raise the fruit from the surface of the shell to expose a maximum of the surface of the fruit to ripening gases.

---

This invention relates to the packing, protection, transporting and controlled ripening of perishable fruit, and more particularly it relates to the packaging, storing, ripening, and transportation of bananas.

A principal object of the invention is to provide a novel method of packaging and protecting bananas whereby, after harvesting, they can be packaged in such a way as to improve their response to usual aging or similar ripening environmental treatment.

Another object is to provide a method and apparatus for packaging bananas or similar fruit in individual groups in a protective device which aids in the controlled ripening, or other environment treatment, and whereby the protective device protects the bananas from damage due to handling and transporting both before and after ripening. The protective device can also be used as the display holder for use in retail establishments and the like.

Another object is to provide an improved multiunit packaging method and arrangement for the handling and transportation of bananas, whereby the bananas when unpackaged and displayed are substantially free from damage or localized deteriorations.

A feature of the invention relates to a novel packaging unit or tray for bananas and the like.

As is known in the art, after the bananas are harvested they are subjected to a ripening or aging treatment in specially constructed ripening rooms, whereby the temperature, ventilation and humidity conditions can be precisely controlled. During this ripening process the bananas "break color," that is they change from a so-called hard green to a lighter green or even to a light yellow color. It is important during this ripening treatment that the entire peripheral surface of each banana be exposed as uniformly as possible to the ingress and egress of gases either evolved from the bananas or to which they may be exposed.

During ripening, the fruit evolves gases such as carbon dioxide, ethylene, and probably some small amounts of volatile esters. It has been found that the ripening process can be expedited and rendered more uniform if these evolved gases are confined within the chamber or room wherein the bananas are being ripened. In any event, it is important that the entire surface of the aging bananas so far as possible be subjected to the same evironmental aging conditions.

We have found that, in order that the ripened bananas shall have the desired uniform ripened color and attractive appearance, it is important that each cluster or group of bananas be supported in a container or tray of novel physical construction and of a material which because of its inherent insulation and reflective characteristics enhances the ripening process in such a way as to produce the desired color and appearance. We have found that desirable results are obtained when the bananas are packaged or supported in a specially shaped tray or shell of a chemically inert foamed plastic, of which foamed polystyrene is typical.

It is desirable both from the economic viewpoint as well as from the viewpoint of having uniformity of ripened appearance among large batches of bananas, to support the bananas not only during the aging or ripening process but also during the storage and transportation, handling, etc., in a container or tray which can also be used as the final display container for display of the bananas in the retail establishment. We have devised a method of packaging bananas, so that they can be retained in place as a group or cluster in a special container or tray which is free from fibrous stock, it having been found that the usual cardboard, paper or wood boxes ordinarily used for this purpose by reason of their surface and inherent chemical characteristics do not fully protect bananas from damage.

Furthermore, the foamed plastic is chemically inert with respect to the chemicals in the banana peel and also to the gases which are released or which may be used during the ripening process. Where the usual cardboard, paper or wood containers are employed for packaging the bananas, the chemical constitutents of such containers may have an undesirable effect on the bananas peel, particularly at those points where the peel is subjected to localized pressure, friction or rubbings. Furthermore, by using a foamed plastic such as polystyrene, even though it is of foamed interior construction, if it is of the so-called closed cell interior formation, it is a moisture barrier. When the bananas are packed in tiers in the usual way in a shipping carton or box, there is a considerable amount of heated gas or gases inherently generated by the bananas during the ripening process. Since these gases do tend to rise toward the top of the box, the uppermost bananas are subjected to a different temperature from the lowermost bananas. By assembling the bananas in the foamed plastic trays according to the invention, these trays also act as separators and heat reflectors and distributors between the several layers of bananas. By reason of the construction and fluted surface of these trays they cause the said heated gases to be reflected and more uniformly distributed amongst and around the various bananas.

The problem of preventing damage and weakening of the epidermis and of the cut in film is even more severe during shipment or transportation, since the vibration of the transporting vehicle may cause excessive rubbing between the bananas and the usual wood, fiberboard, or cardboard cartons in which the bananas are contained. This is particularly true where the bananas are relatively tightly packed in a container of cardboard, wood or similar fibrous stock.

In accordance with our invention, by novel mechanical design of the supporting tray or container, and by using an inert foamed plastic therefor, the inherent resiliency of the foamed plastic, not to mention its lightness in weight and its very low coefficient of surface friction, greatly reduces the likelihood of damage.

Accordingly, it is a particular feature of this invention to provide a novel method of packaging bananas and similar fruit whereby losses due to discoloration or undesirable surface spottings or changes or other damage are greatly reduced.

In the drawing,

FIG. 1 is a top plan view of our novel banana tray or receptacle;

FIG. 2 is a top plan view of FIG. 1;

FIG. 3 is a right-hand end view of FIG. 2;

FIG. 4 is a longitudinal sectional view of FIG. 2 taken along the line 4—4 thereof showing a cluster of bananas supported therein;

FIG. 5 is a transverse sectional view of FIG. 4 taken along the line 5—5 thereof;

FIG. 6 is a cross-sectional view showing one method of stacking or packaging of the various banana-containing trays within an enclosing carton;

FIG. 7 is a sectional view of FIG. 6 along line 7—7 showing the trays in stacked array but with the bananas omitted;

FIGS. 8 and 9 are views respectively siliar to FIGS. 6 and 7 showing an alternative arrangement for stacking the banana-containing trays within the enclosing carton.

Referring to the drawing, there is shown one preferred form of the banana supporting and display device according to the invention. It is in the form of a concave shell or tray 10 having a concave curvature conforming in general to the convex curvature of a typical banana as shown in FIG. 4. The shell at its deep end 11 is formed with a contour which is curved in transverse planes and this curved portion extends to a tapered shallower portion 12 which terminates in a flat flanged portion 13.

The sides of the tapered portion 12 are formed, as by molding, with a series of smoothly rounded or flat embossed ribs 14, 15 which do not extend completely around the bottom of the shell, and thus they define a series of side channels 16 which communicate with a longitudinal channel 17. Likewise the portion 11 is provided with a series of embossed ribs 18 which define a corresponding series of channels 19. Similarly, the extreme right-hand end of shell 10 is formed with a pair of embossed ribs 20, 21 which define a channel 22 communicating with channel 17. Shell 10 at its opposite median edges is provided with integral flanges 23, 24 each having a cutaway elongated notch 25, 26. These flanges can be bent upwardly, as indicated by the dotted outlines in FIG. 4, to receive a retaining band as will be described hereinbelow in connection with FIGS. 4 and 5.

In accordance with the invention shell 10 is formed of a foamed plastic polystyrene or other similar foamed or expanded thermoplastic sheeting, for example of the order of 1/16 inch expanded thickness. The sheet is manufactured in the well-known manner so as to have a multiplicity of minute non-communicating or closed cells or pockets within the body of the sheet. By reason of the closed cell construction, the sheet is non-porous and impervious to moisture. Furthermore, the plastic is chemically inert with respect to any of the liquids or gases which may be released by the bananas loaded into the shell or by any of the gases that may be used to assist in ripening the bananas. Such foamed plastic sheeting is prepared with a high order of resiliency considered in a direction through its thickness, and yet even though it is extremely lightweight, has a relatively high order of mechanical strength. As is well known, such foamed plastic sheets, during manufacture are prepared so that the surface has a high degree of smoothness and, of course, it is completely free from any hair-like or fibrous protuberances such as are necessarily involved when cardboard, wood or similar fibrous stock is employed. In addition, the embossed ribs themselves are of substantial resiliency, and being smoothly contoured, they intersect the linear edges 27 of the bananas in a small contacting area as indicated in FIG. 5. Consequently when a cluster of bananas is loaded into the shell, as shown in FIGS. 4 and 5, practically the entire peripheral surface of each banana is exposed to the free access of ripening gases or the free exit of gases that may be released from the bananas. In order to prevent dislodgment of the loaded bananas, the flanges 23, 24 can be bent upwardly as shown in FIG. 5, and a transparent band or film 28 of polyethylene, or similar inert thermoplastic can be wrapped around the shell and the overlapped ends 29 can be suitably fastened as by heat sealing or an endless elastic plastic band can be used for that purpose. Band 28 may be the same width as the notches 24, 25, thus preventing it slipping horizontally of the shell.

While FIGS. 4 and 5 show a typical cluster of bananas 30 to 35 emanating from the same stalk 35', it will be understood that the clusters each may consist of a greater or less number of bananas or fingers, as they are referred to in the art.

From the foregoing it will be seen that each shell constitutes with its bananas an individual unit which can be packed into a suitable carton together with other units directly after harvesting of the bananas or at some later date. In other words, the bananas can if desired, be immediately stacked in a carton wherein they can be transported to the usual aging or ripening room where they can be subjected to the usual ripening procedures. The carton can then be shipped without further operations. The units upon their arrival at their destination, for example at a retail outlet, can be individually removed from the carton and directly used in the shells as display units.

With the method of loading each unit as above described, it is possible to stack a large number of such units in the carton and eliminate or reduce the damage or localized deteriorations of the bananas during handling and shipping. We have found that it is possible to stack the units so that no surfaces of any of the bananas either in their individual shells or in the enclosing carton come in rubbing or pressure contact with any surface other than smooth resilient foamed plastic. Thus as shown in FIGS. 6 and 7, the individual loaded shells or units are shown stacked in two tiers in an enclosing carton 36. Carton 36 has its walls provided with a number of openings 37 to permit the ripening gases to have ready ingress and egress to all the bananas. The carton 36 can be made of two telescoping halves 36a, 36b, each of which is provided with a series of openings 37 which become aligned with each other when the telescoping halves of the carton are in telescoped relation. The lower tier of packed units, consisting for example of nine such units, have those units resting on the bottom of the carton in nested staggered relation with the curved portions 11 of the right-hand units abutting against one side wall of the container, and with the curved portion 11 of the various units abutting against the opposite side walls of the container. The width of the container can be designed so that when each pair of units is completely nested they closely fit between the container side walls, but because of the conformation of the shell no surface of any of the bananas comes into contact with the container walls or with any other group of bananas.

The next tier of nine units is similarly stacked in staggered relation, thus filling the carton 36. With this method of packaging, the bananas in the respective shells are protected from rubbing on the bananas in adjacent shells and for all practical purposes each cluster may be considered as substantially completely bounded by the smooth surface of the foamed plastic. In order to protect the upper tier of bananas against rubbing contact with the carton top, a sheet 38 of so-called formed plastic foam, which may be similar to the material of the trays 10, is inserted into the carton between the top wall and the top tier of bananas. With this arrangement no banana surface is in rubbing contact with anything but the foamed plastic material. Instead of packing the several units in any given tier in staggered relation as in FIGS. 6 and 7, they may be packed in directly superposed non-staggered nested relation as shown in FIGS. 8 and 9, or any other suitable arrangement so long as each tray acts as a complete separator from each other tray.

While we do not desire to be limited to any theory as to why the above described method of individual unit and multiple-unit packaging enables the bananas to be ripened and stored and shipped without increasing the likelihood of damage or deteriorations, it is probably due to the fact that the bananas are always in contact with an inherently resilient and chemically inert and smooth surface of the foamed plastic. Furthermore, because of this particular method of packaging, the ripening or aging process can continue uniformly from the time the bananas are packaged until they arrive at retail outlet. Since the bananas can be directly packed after harvesting, the percentage of wastage is materially reduced. In any event, it has been found that the above described method increases to a considerable degree the delivery of bananas to the retail outlets with substantially uniform characteristics as compared with the usual packing and ripening procedures.

It will be understood, of course, that while the invention achieves its advantages by the use of polystyrene foamed or expanded plastic, other foamed or expanded plastics having similar physical and chemical characteristics to foamed polystyrene may be used.

While in the foregoing reference has been made to the supporting shell as being constituted of foamed plastic, it will be understood that the invention is not limited to material comprised entirely of such plastic providing the polystyrene foam forms a major part of the body of the plastic and provided the shell has the necessary chemical inertness, thickness, resiliency and surface smoothness. The invention, therefore, contemplates the use of such foamed plastic in combination with other fillers or materials which do not affect the chemical inertness, mechanical strength, resiliency or surface smoothness of the material.

Various changes and modifications may be made in the disclosed embodiment without departing from the spirit and scope of the invention.

What is claimed is:

1. A method of packaging bananas for shipment and controlled ripening comprising:
   supporting clusters of bananas in individual foamed plastic shells having a contour generally corresponding to the longitudinal contour of a banana cluster, restricting the contact between the cluster and the shell to a plurality of raised ridges integral the shell, thereby to permit ripening gases to contact substantially the entire banana surface while being supported by the shell.

2. The method of claim 1 wherein said plastic shells having a plurality of raised ridges upon their exterior surfaces, and wherein a plurality of said shells with banana clusters therein are stacked, one upon the other in a container, so that the raised ridges upon the exterior surfaces of said shells permit ripening gases to contact substantially the entire surface of a banana cluster in contact with a shell above.

3. The method of claim 2 wherein said plastic shells with banana clusters therein are stacked in an enclosing carton having openings for ingress and egress of gases, and the interior of said enclosed carton and the bananas therein subjected to a controlled ripening gas atmosphere.

4. A packaging unit comprised of a cluster of bananas in a foamed plastic container, said container comprising a shell having the general contour of a cluster of bananas, and having a plurality of ridges and valleys in the inside surface thereof, said ridges running generally laterally with respect to the bananas disposed therein, so that substantially the entire surfaces of the bananas lying adjacent to said shell are exposed to their surrounding atmosphere.

5. A nest of the units of claim 4 wherein a plurality of said units are stacked one upon the other, and wherein the shells of said units are further comprised of ridges and valleys in the exterior surface thereof, so that substantially the entire surfaces of the bananas upon which the shells are stacked are also exposed to their surrounding atmosphere.

References Cited

UNITED STATES PATENTS

| 2,164,025 | 7/1937 | Schwertfeger | 99—171 |
| 2,744,018 | 8/1950 | Brebner | 99—171 |
| 2,843,496 | 7/1956 | Altenburg et al. | 99—171 |
| 3,069,274 | 12/1962 | Concannon | 99—154 |
| 3,139,348 | 6/1964 | Reifers et al. | 99—171 |
| 3,285,411 | 11/1966 | English | 206—65 |
| 3,261,530 | 7/1966 | Cave | 229—2.5 |

RAYMOND N. JONES, *Primary Examiner.*

S. B. DAVIS, *Assistant Examiner.*

U.S. Cl. X.R.

99—154; 229—2.5